United States Patent
Enevoldsen et al.

(10) Patent No.: US 12,535,053 B2
(45) Date of Patent: Jan. 27, 2026

(54) BLADE FOR A WIND TURBINE COMPRISING MEANS FOR RETAINING A SPOILER AT A RETRACTED POSITION

(71) Applicant: Siemens Gamesa Renewable Energy A/S, Brande (DK)

(72) Inventors: Peder Bay Enevoldsen, Vejle (DK); Florian Girschig, Skørping (DK); Alejandro Gomez Gonzalez, Aarhus (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 28 days.

(21) Appl. No.: 17/925,289

(22) PCT Filed: May 10, 2021

(86) PCT No.: PCT/EP2021/062277
§ 371 (c)(1),
(2) Date: Nov. 14, 2022

(87) PCT Pub. No.: WO2021/233710
PCT Pub. Date: Nov. 25, 2021

(65) Prior Publication Data
US 2023/0220829 A1 Jul. 13, 2023

(30) Foreign Application Priority Data
May 19, 2020 (EP) .................................... 20175422

(51) Int. Cl.
*F03D 7/02* (2006.01)
*F03D 1/06* (2006.01)
*F03D 13/20* (2016.01)

(52) U.S. Cl.
CPC .......... *F03D 7/0236* (2013.01); *F03D 1/0633* (2013.01); *F03D 13/20* (2016.05); *F05B 2240/31* (2013.01)

(58) Field of Classification Search
CPC .......... F05B 2240/3052; F05B 2240/31; F05B 2240/3062; F05B 2240/311;
(Continued)

(56) References Cited

U.S. PATENT DOCUMENTS 5,106,265 A 4/1992 Holzem
8,251,656 B2 * 8/2012 Stiesdal ................ F03D 7/0232
416/228
(Continued)

FOREIGN PATENT DOCUMENTS

CA 2625070 A1 4/2007
CN 109996956 A 7/2019
(Continued)

*Primary Examiner* — Eric J Zamora Alvarez
(74) *Attorney, Agent, or Firm* — Schmeiser, Olsen & Watts LLP

(57) ABSTRACT

A wind turbine includes a blade. The blade includes a blade body; an active member mounted to the blade body and configured to move between a retracted position and an extended position to change an aerodynamic property of the blade; and a bladder which is configured to be connected to a pneumatic or hydraulic system of the wind turbine to move the active member when the bladder is filled by a fluid supplied by the pneumatic or hydraulic system, or when the fluid is removed from the bladder by the pneumatic or hydraulic system. The wind turbine includes a retaining means configured to prevent the active member from moving towards the extended position.

16 Claims, 12 Drawing Sheets

(58) Field of Classification Search
CPC ............ F05B 2240/122; F05B 2240/30; F05B 2260/901; F05B 2270/604; F05B 2270/605; F05B 2270/402; F05B 2240/305; F05B 2240/301; F05B 2240/98; F05B 2240/32; F03D 7/0232; F03D 1/0675; F03D 1/0633; F03D 7/022; F03D 7/0252; F03D 7/042; F03D 7/0236; F03D 13/20; F03D 1/0685; F03B 3/123; Y02E 10/72

See application file for complete search history.

(56) References Cited

U.S. PATENT DOCUMENTS

| | | | |
|---|---|---|---|
| 8,647,059 B1 * | 2/2014 | Szefi | B64C 27/72 416/1 |
| 8,851,840 B2 | 10/2014 | Hancock et al. | |
| 10,421,533 B2 * | 9/2019 | Domel | B64C 3/14 |
| 2007/0003403 A1 | 1/2007 | Pedersen et al. | |
| 2008/0292461 A1 | 11/2008 | Fleischmann | |
| 2012/0134803 A1 | 5/2012 | McGrath et al. | |
| 2012/0134814 A1 | 5/2012 | Mcgrath et al. | |
| 2012/0141271 A1 | 6/2012 | Southwick | |
| 2016/0177922 A1 | 6/2016 | Zamora Rodriguez et al. | |
| 2018/0171975 A1 * | 6/2018 | Röhm | B64C 3/46 |
| 2019/0186463 A1 * | 6/2019 | Akay | F03D 7/0224 |

FOREIGN PATENT DOCUMENTS

| | | |
|---|---|---|
| DE | 102015113347 A1 | 7/2016 |
| EP | 1623111 A1 | 2/2006 |
| EP | 1995455 A1 | 11/2008 |
| EP | 2664791 A2 | 11/2013 |
| EP | 3290688 A1 | 3/2018 |
| WO | 2010043647 A2 | 4/2010 |
| WO | 2018041420 A1 | 3/2018 |

* cited by examiner

BLADE FOR A WIND TURBINE COMPRISING MEANS FOR RETAINING A SPOILER AT A RETRACTED POSITION

CROSS-REFERENCE TO RELATED APPLICATIONS

This application claims priority to PCT Application No. PCT/EP2021/062277, having a filing date of May 10, 2021, which claims priority to EP Application No. 20175422.3, having a filing date of May 19, 2020, the entire contents both of which are hereby incorporated by reference.

FIELD OF TECHNOLOGY

The following relates to a wind turbine and to a blade for a wind turbine, which comprise a retaining means which is configured to prevent an active member such as a spoiler of the blade from moving towards an extended position by external forces. The following also relates to a method of controlling the wind turbine.

BACKGROUND

A conventional wind turbine comprises a tower, a nacelle mounted to a top of the tower, a hub being rotatable mounted to the nacelle, and at least one blade mounted to the hub. The blade comprises a blade body to which an active member such as a spoiler is mounted. An outer surface of the blade including the active member forms a so-called airfoil. The active member is configured to move between a retracted position and an extended position to change an aerodynamic property of the blade, for example to cause the flow around the airfoil to stall when the active member is positioned in the extended position. In an internal prior art, a bladder is provided which is configured to be connected to a pneumatic or hydraulic system of the wind turbine to move the active member when the bladder is filled by a fluid supplied by the pneumatic or hydraulic system, or when the fluid is removed from the bladder by the pneumatic or hydraulic system. The bladder is connected via a hose to the pneumatic or hydraulic system which comprises pumps, or any other type of machine able to create pressure and suction such as blowers, compressors, etc. When the airflow around the airfoil shall be changed, the spoiler is lifted by inflating the bladder.

When no change of the airflow around the airfoil is necessary, the spoiler needs to be kept retracted in the retracted position close to the blade in order not to disturb the flow of air around the airfoil and to minimize the drag penalty.

The blade may have installed a flow regulating device on its surface. An example of such a flow regulating device is a vortex generator (VG). The spoiler may act in concert with the vortex generator and may influence the effect of the vortex generator depending on the state of the spoiler. The state of the spoiler may relate to a protrusion height and/or tilt angle by which the spoiler extends from or is tilted relative to other surface portions of the rotor blade. The spoiler can be used to actively suppress the function of the flow regulating device, or fully bypass the flow regulating device and cause local aerodynamic stall of the airfoil. In general, a flow regulating device may be considered to comprise a device which is capable of, for example, enhancing the lift coefficient of the airfoil section, for example by increasing the level of energy of the boundary layer of the rotor blade.

EP 1 623 111 B1 discloses a wind turbine blade including adjustable lift-regulating means arranged on or at the surface of the wind turbine blade and extending in the longitudinal direction of the blade and an activation means by which the lift-regulating means can be adjusted and thus alter the aerodynamic properties of the blade. The lift-regulating means comprise one or more flexible flaps.

U.S. Pat. No. 8,851,840 B2 discloses a wind turbine blade comprising a blade body and a device for modifying the aerodynamic surface or shape of the blade, wherein a pneumatic actuator controls the position and/or movement of the device, wherein a pressure chamber positioned within the blade body is present. The pressure chamber may be pressurized thereby changing the state of the device, thereby modifying the aerodynamic surface or shape of the blade.

U.S. Pat. No. 5,106,265 A discloses a wind turbine blade comprising a pneumatically actuated spoiler movable perpendicular to an airstream.

WO 2018/041420 disclose a rotor blade comprising an aerodynamic device for influencing the air flow flowing from the leading edge section of the rotor blade to the trailing edge section of the rotor blade, wherein the aerodynamic device is mounted at a surface of the rotor blade and comprises a pneumatic or hydraulic actuator, such as a hose or a cavity of which the volume depends on the pressure of the fluid being present inside the pneumatic or hydraulic actuator.

SUMMARY

There may be a need for wind turbine and a blade for a wind turbine in which an active spoiler member can be retained in the retracted position by simple and inexpensive modifications.

According to a first aspect of embodiments of the invention, a wind turbine comprises a tower, a nacelle mounted to a top of the tower, a hub being rotatable mounted to the nacelle, and at least one blade mounted to the hub. The blade comprises a blade body; an active member mounted to the blade body and configured to move between a retracted position and an extended position to change an aerodynamic property of the blade such as the lift or the drag of specific airfoil sections, or both the lift and the drag simultaneously; a bladder which is configured to be connected to a pneumatic or hydraulic system of the wind turbine to move the active member when the bladder is filled by a fluid supplied by the pneumatic or hydraulic system, or when the fluid is removed from the bladder by the pneumatic or hydraulic system; and a retaining means configured to prevent the active member from moving towards the extended position. The retaining means comprises at least one of the following: a) a suction means configured to control a predetermined fluid pressure within the bladder which prevents the bladder from inflating due to a pressure build up due to centrifugal forces on the fluid inside the bladder which is created when the hub rotates. b) the bladder is fixed both to a baseplate and/or to the blade body and to the active member, wherein the active member is pressed and/or retained in the retracted position by a suction means configured to apply a negative pressure in the bladder (a negative pressure, in this context, means a pressure which in absolute level is lower than the atmospheric pressure); and c) a suction pressure reduction element being provided at the blade body adjacent a trailing edge of the active member or at the trailing edge itself, wherein the suction pressure reduction element is configured to reduce a suction pressure induced by an airflow on the active member when the active member is in the retracted position. The retaining means of options a) to c) can be implemented either separately or in any combination.

In the retaining means of option a), by actively applying a suction pressure, for example through pumps installed in the hub, the forces tending to inflate the bladder, being 1) the centripetal acceleration acting onto the fluid inside the hose and bladder, and 2) the below-atmospheric pressure potentially acting on the outside of the bladder, are counteracted, hereby preventing the bladder from inflating. As such, the use of suction pressure can enable to reduce the spoiler pretension, thereby reducing loads, simplifying the design, and increasing the spoiler's lifetime.

Option b) without option a) can be beneficial to improve the system's robustness, where the spoiler is going to be accidentally lifted in the event of a reverse airflow (an airflow going from the trailing edge to the leading edge). The reverse airflow can occur, for example on a parked (non-operating) wind turbine blade, either when mounted on the wind turbine, during blade transport etc.

When used in combination with option a), option b) enables to also counteract the local lift force acting on the spoiler, thereby further reducing the requirement for spoiler pretension, thereby further reducing the loads, simplifying the design and increasing the spoiler's lifetime. In an extreme case, the pretension can be entirely suppressed, and the spoiler can feature a mechanical or an elastomeric hinge.

In the retaining means of option c), if the active member such as a spoiler ramps down downwards to the blade's airfoil nominal surface, a local suction can result from the local airflow, leading to a local lift-force acting on the spoiler, which the pretension and/or options a) and b) together need to counterbalance to keep the spoiler retracted. Using an additional ramp-down element in the shape of the suction pressure reduction element, which can be glued or installed right behind the spoiler such that the trailing edge of the spoiler rests on it or beside it when the spoiler is retracted. By designing the upper surface of the spoiler to be flush with the element placed aft of the trailing edge of the spoiler (or on which the trailing edge of the spoiler rests), the pressure distribution along the top side of the spoiler can be influenced in such a way that the total lifting force on the spoiler is reduced, therefore reducing the force requirement of any retainment means (e.g. spoiler pretension) to maintain the spoiler in a retracted position, leading to a simplification of the design, a reduction of the loads and an increase of the spoiler's lifetime.

The suction pressure reduction element can also be realized by a predetermined shape or contour of the blade body adjacent a trailing edge of the active member or of the trailing edge itself, which is beneficial in order to reduce the local lift caused by the outer flow at the active member which tries to lift the active member. For example, the predetermined shape or contour of the trailing edge of the active member can be made to be flush with a portion of the blade body located behind the trailing edge of the active member.

Embodiments of the present invention achieve a more slender design (i.e. the total protruding height of the spoiler beyond the surface of the airfoil is reduced) which is enabled by the reduction of the loads, which is enabled by the principle of pneumatic or hydraulic suction in the pneumatic (air supply) or hydraulic system, so that the aerodynamic penalty in terms of drag increase of the airfoil sections is minimized. Furthermore, the blade's spoiler lifetime, measured by the number of allowable activations, can be lengthened which results from lowered loads and strains internal to the spoiler element.

Also the system design is simplified, which results from the ability to reduce the degree of pretension, or even to completely suppress the pretension.

The response time of the system can be decreased by moving the bladder closer to the leading edge of the spoiler and therefore designing with a smaller bladder despite reaching the same lifted spoiler geometry. Moving the bladder closer to the leading edge without implementing methods to reduce the pretension requirement would be detrimental for the lifetime of the spoiler because of the internal loads increase when the spoiler is lifted by inflating the bladder.

The aerodynamic effect of the system can be increased, and the system's response time decreased. Further, the fatigue loads affecting the main components (blade, hub, tower, foundation) are reduced. This advantage is achieved by the retaining means of all options a) to c).

In an embodiment, the wind turbine further comprises an abutment member arranged at one of the active member, and/or a baseplate and/or the blade body, wherein the abutment member defines the retracted position of the active member when the abutment member abuts on or presses to the other one of the active member, a baseplate and/or and the blade body. In an embodiment, the abutment member is shaped as a leg or a rib.

In an embodiment, a limiting member is arranged within the bladder, wherein the limiting member defines a minimum deflated state of the bladder. This is particularly advantageous in the retaining means of option a) which uses partial suction pressure, because the limiting member prevents the bladder from closing airtightly under vacuum (i.e. fully collapsing as to prevent flow or fluid inside the bladder) and potentially prevents a portion of the bladder to deflate completely. The limiting member can be an extruded rib inside the bladder or an additional member placed inside the bladder, for example a mesh or a foam.

In an embodiment, the suction pressure reduction element is shaped as a bulge. In an embodiment, the suction pressure reduction element is combined with a vortex generator. The vortex generator can serve as a flow regulation device to regulate the air flow.

In an embodiment, the wind turbine further comprises a control means configured to control a fluid pressure within the bladder.

According to a second aspect of embodiments of the invention, a method of controlling a wind turbine is provided, wherein the wind turbine comprises a tower, a nacelle mounted to a top of the tower, a hub being rotatable mounted to the nacelle, and at least one blade mounted to the hub, and the blade comprises a blade body, an active member which is mounted to the blade body and configured to move between a retracted position and an extended position to change an aerodynamic property of the blade, a bladder which is configured to be connected to a pneumatic or hydraulic system of the wind turbine to move the active member when the bladder is filled by a fluid supplied by the pneumatic or hydraulic system, or when the fluid is removed from the bladder by the pneumatic or hydraulic system. The method comprises a retaining step to prevent the active member from moving towards the extended position. The retaining step comprises at least one of the following steps: a) a suction step to control a predetermined fluid pressure within the bladder which prevents the bladder from inflating due to a pressure build up due to centrifugal forces on the fluid inside the bladder, which is created when the hub rotates; and b) a suction step to apply a negative pressure in the bladder to press and/or retain the active member in the retracted position, wherein the bladder is fixed to the blade body and the active member.

According to a third aspect of embodiments of the invention, a blade for a wind turbine is provided. The blade comprises a blade body; an active member mounted to the blade body and configured to move between a retracted position and an extended position to change an aerodynamic property of the blade such as the lift or the drag generated aerodynamically by the blade; a bladder which is configured to be connected to a pneumatic or hydraulic system of the wind turbine to move the active member when the bladder is filled by a fluid supplied by the pneumatic or hydraulic system, or when the fluid is removed from the bladder by the pneumatic or hydraulic system; and a suction pressure reduction element being provided at the blade body adjacent a trailing edge of the active member or at the trailing edge itself, the suction pressure reduction element being configured to reduce a suction pressure induced by an air flow on the active member when the active member is in the retracted position, so that the active member is prevented from moving towards the extended position.

In an embodiment, the suction pressure reduction element is shaped as a bulge. The suction pressure reduction element can be combined with at least one vortex generator.

In an embodiment, the blade further comprises a spring or a pretensioned member configured to retract and keep retracted the active member into the retracted position. The spring can be implemented by a flexible portion of the active member. In an embodiment, the active member comprises a movable portion and a stationary airfoil portion with the flexible portion therebetween. Alternatively, the spring can be a component which is separately provided from the active member.

In an embodiment, the blade further comprises an abutment member arranged at one of the active member and/or at a baseplate and/or the blade body, wherein the abutment member defines the retracted position of the active member when the abutment member abuts on or presses to the other one of the active member and the blade body.

BRIEF DESCRIPTION

Some of the embodiments will be described in detail, with reference to the following figures, wherein like designations denote like members, wherein.

Figure 14:
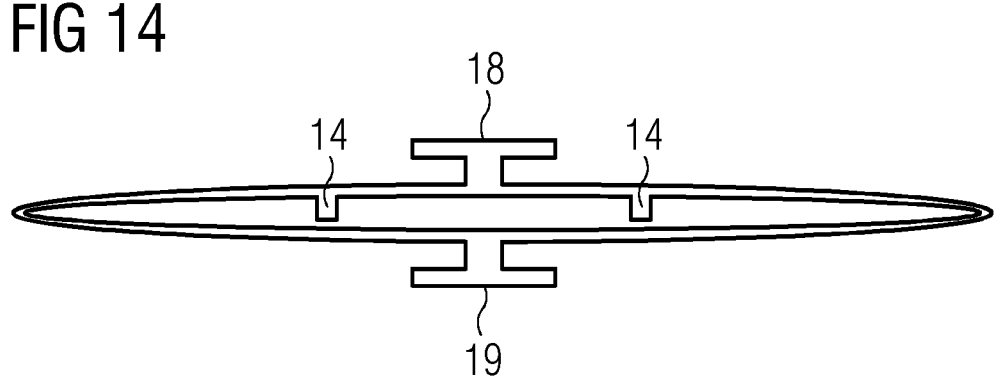
FIG. 14 shows a cross-section view of a bladder according to an embodiment.
Figure 15:
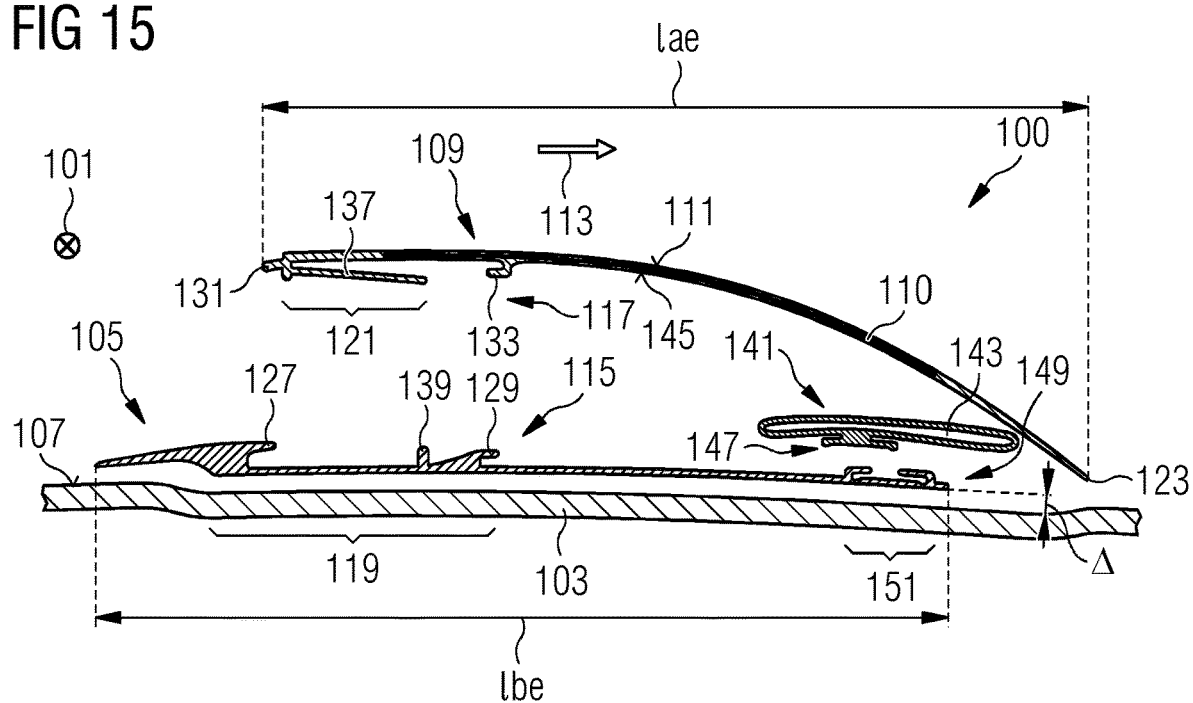
FIG. 15 shows an adaptable spoiler along a longitudinal axis 101 of a rotor blade in a sectional side-view, according to an embodiment.
Figure 17:
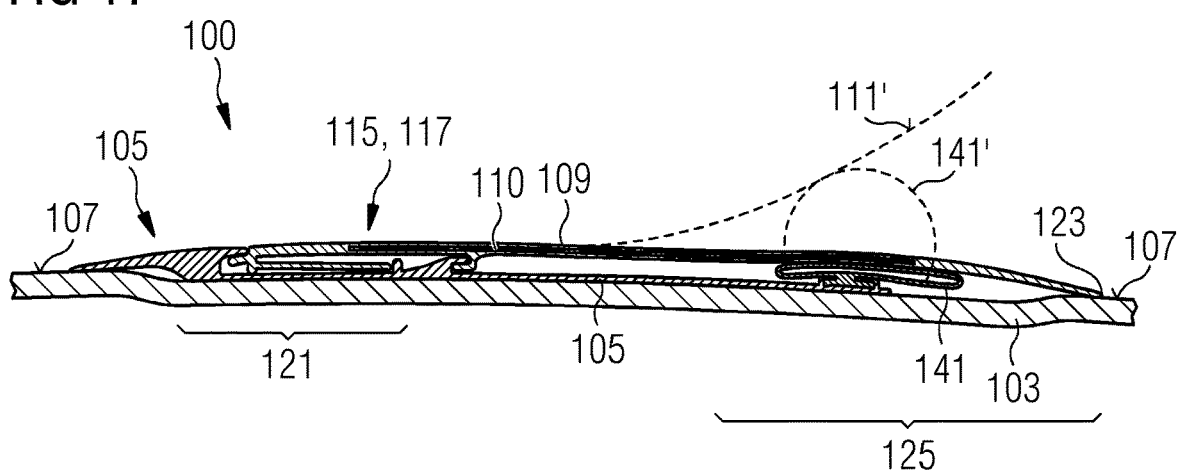
Figure 18:
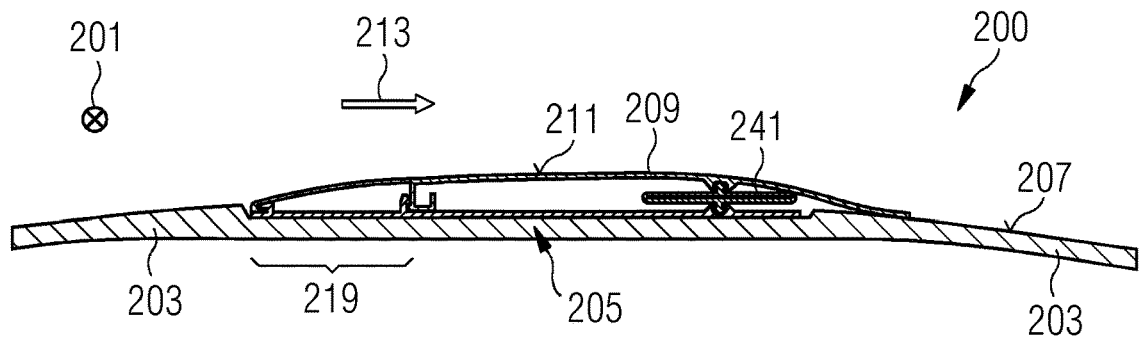
Figure 19:
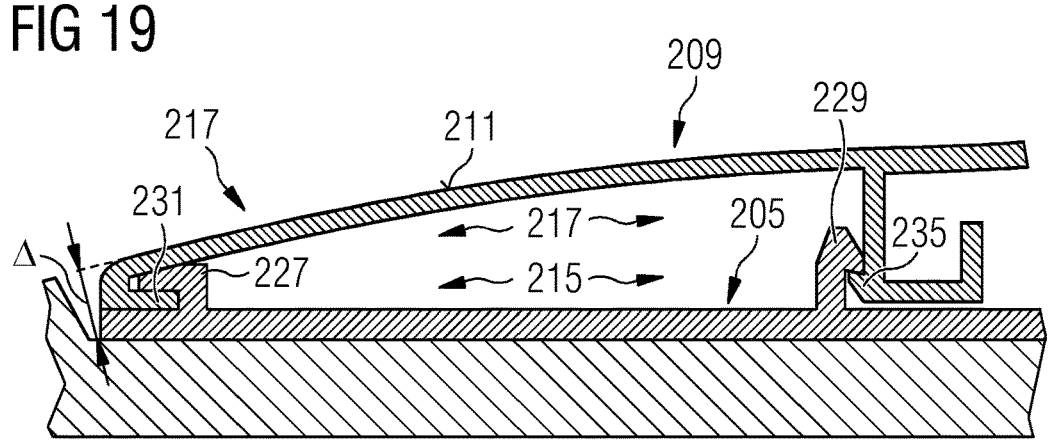
Figure 20:
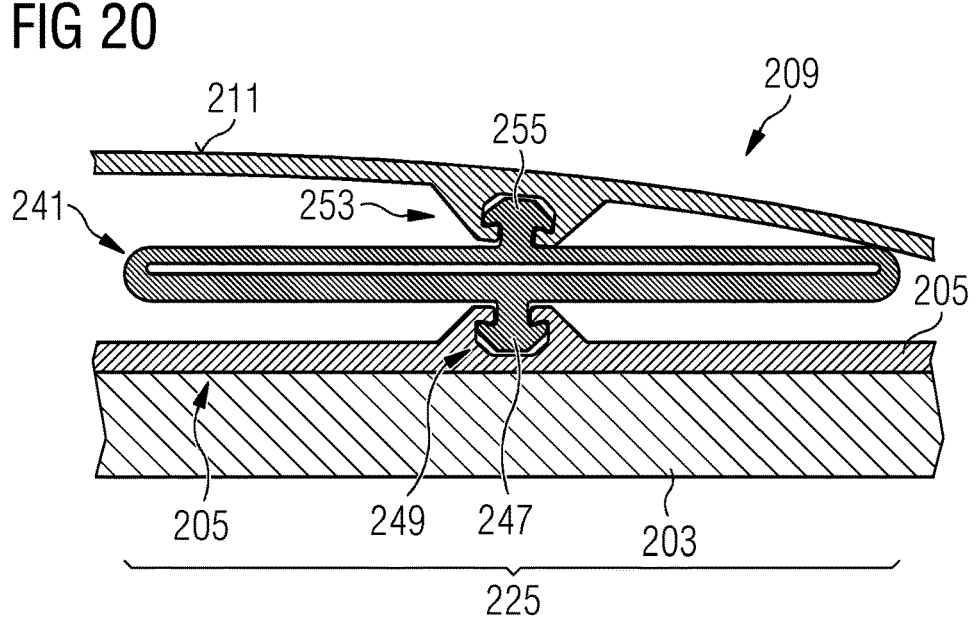
Figure 21:
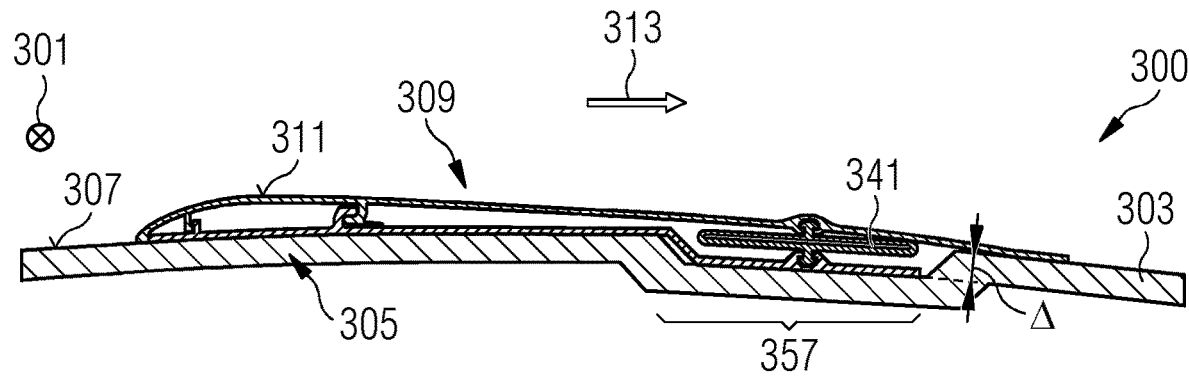
Figure 22:
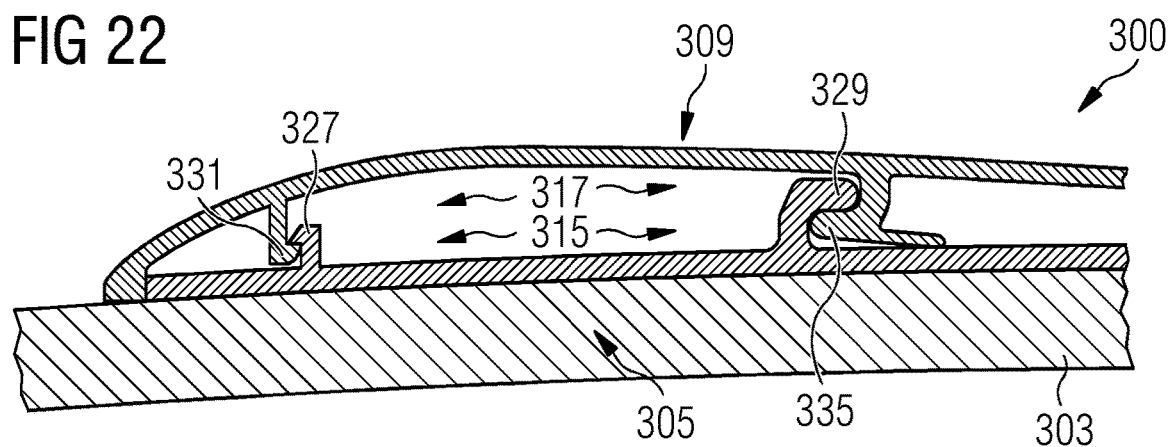
Figure 23:
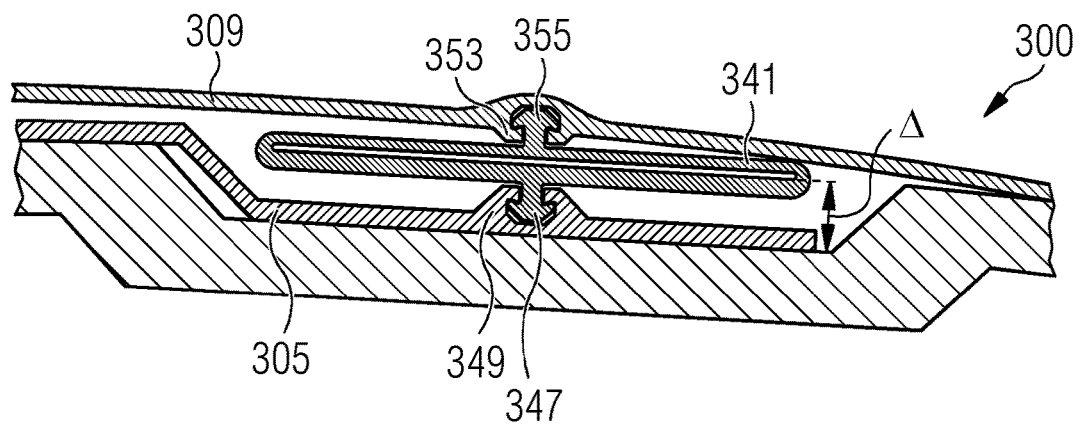
Figure 24:
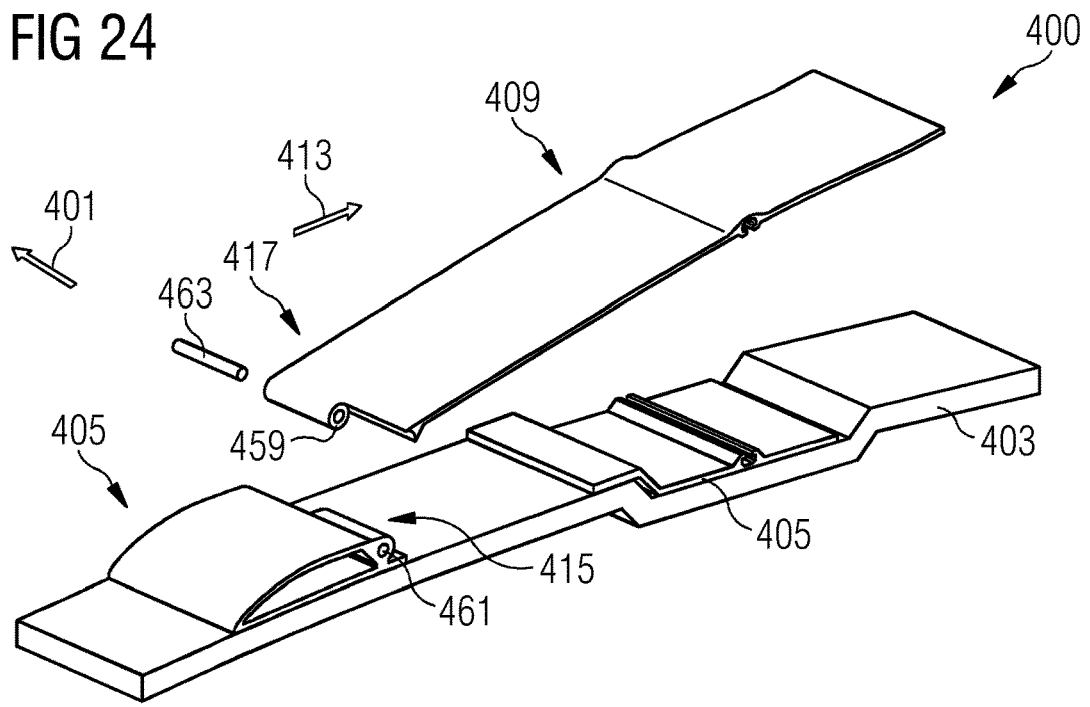
Figure 25:
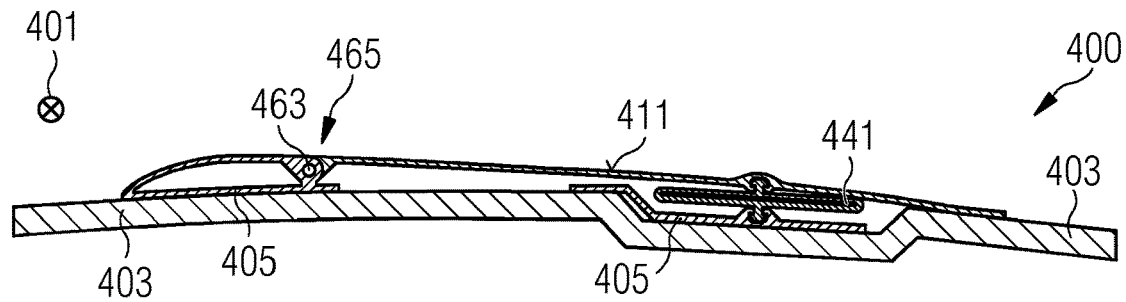
Figure 26:
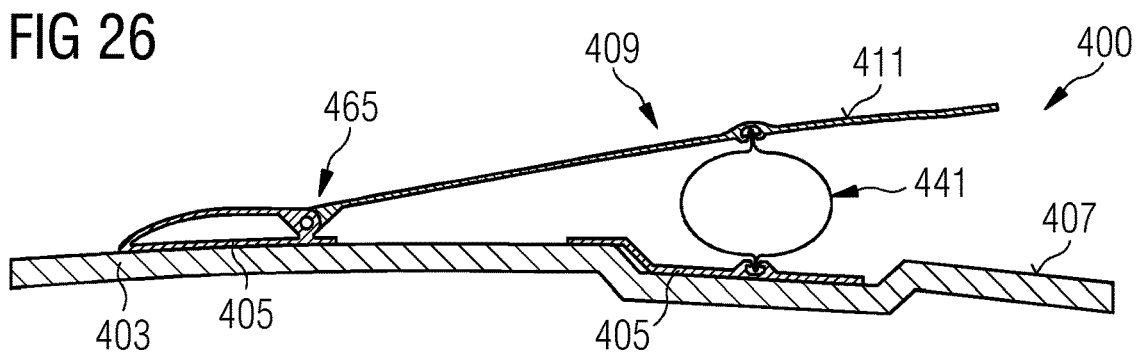
Figure 27:
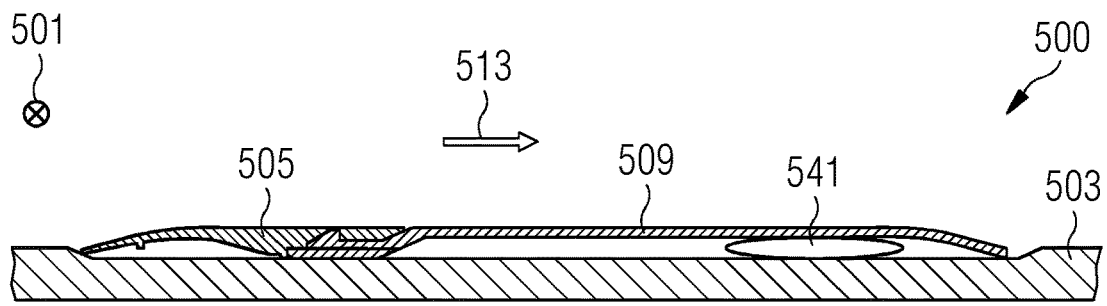
Figure 28:
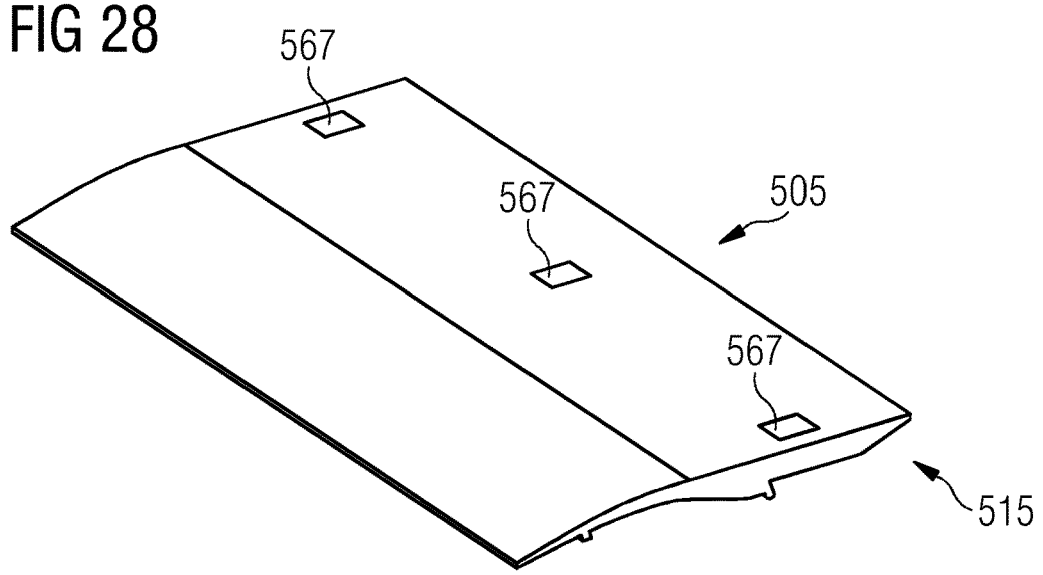
Figure 29:
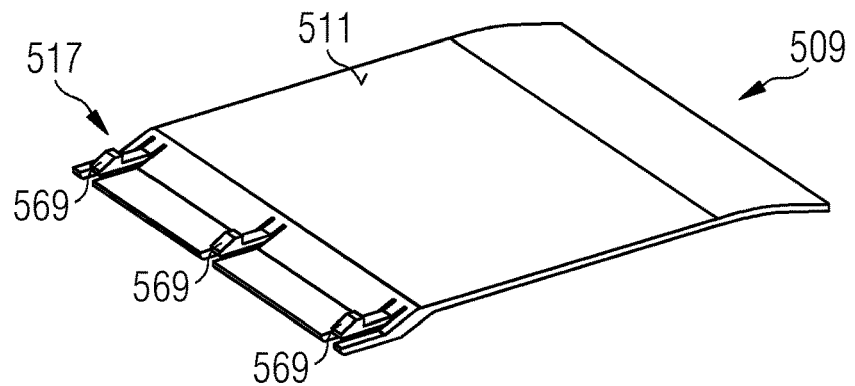
Figure 30:
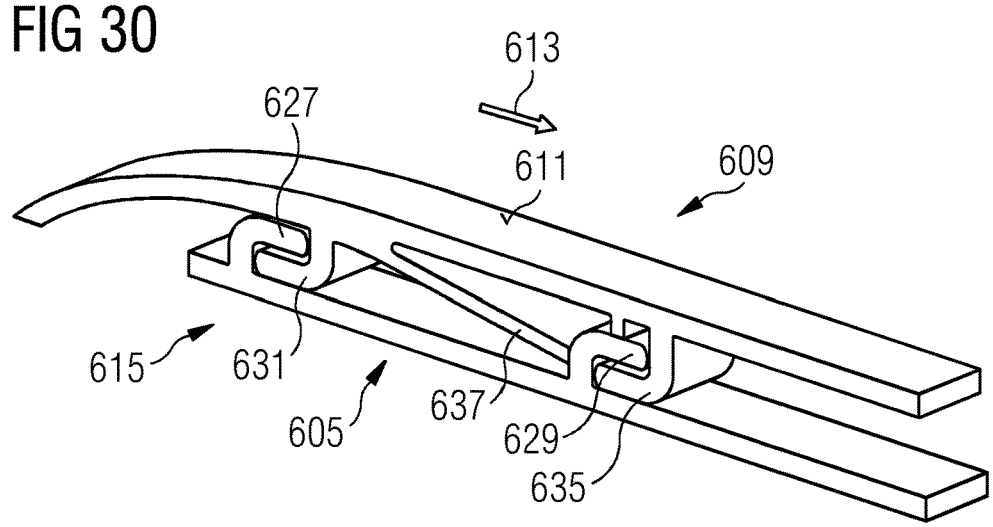
Figure 31:
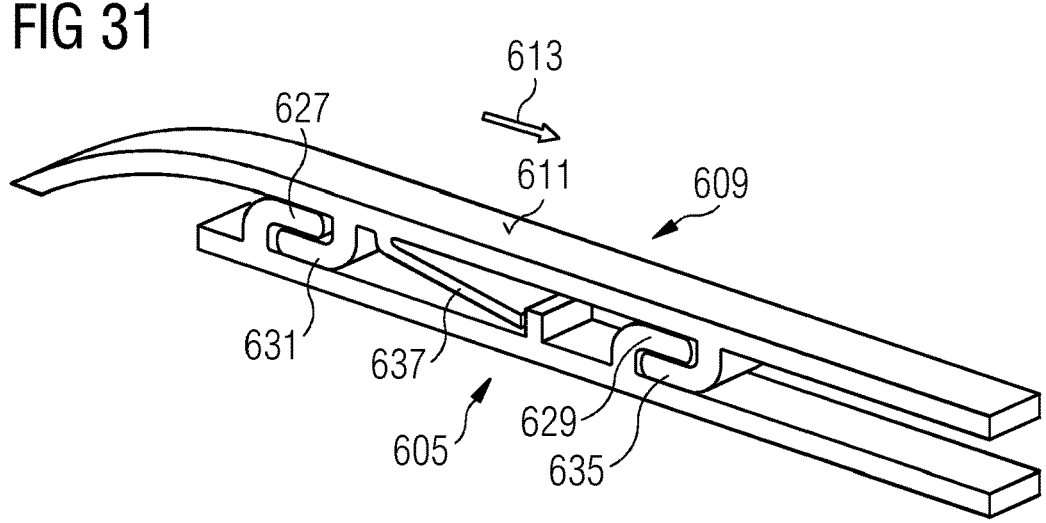
Figure 32:
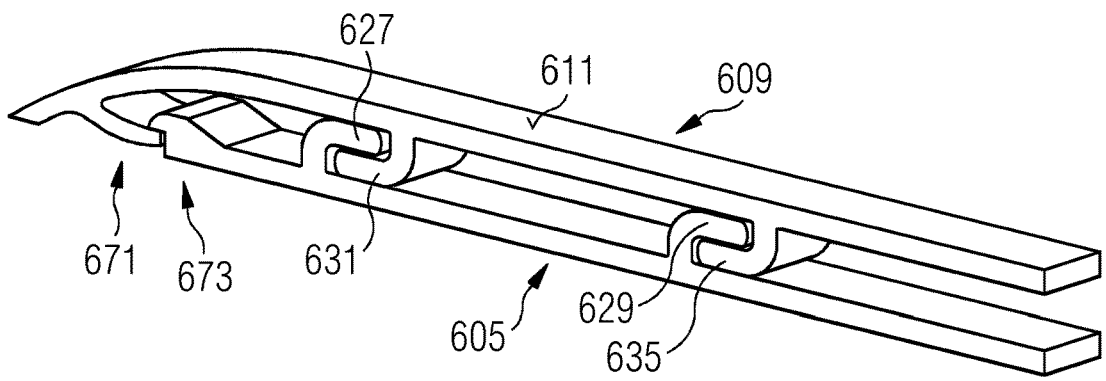

FIG. 17 schematically shows an adaptable spoiler in a disassembled state, in a partial view or in an assembled state according to an embodiment of the present invention;

FIG. 18 shows a sectional side-view an adaptable spoiler according to another embodiment of the present invention;

FIG. 19 shows a sectional side-view and in a partial view an adaptable spoiler according to another embodiment of the present invention FIG. 20 schematically illustrates an adaptable spoiler in a schematic sectional side-view in an assembled state and in partial views according to an embodiment of the present invention;

FIG. 21 shows an adaptable spoiler according to another embodiment of the present invention;

FIG. 22 shows an adaptable spoiler in a partial view, according to an embodiment of the present invention;

FIG. 23 schematically illustrates an adaptable spoiler according to an embodiment of the present invention in an assembled state or in partial views;

FIG. 24 shows an adaptable spoiler according to an embodiment of the present invention;

FIG. 25 shows an adaptable spoiler according to an embodiment of the present invention;

FIG. 26 schematically illustrates in a perspective view an adaptable spoiler according to an embodiment of the present invention and in a sectional side-view in an assembled state;

FIG. 27 shows a schematic view of an adaptable spoiler according to a further embodiment, while in FIG. 28 the base element 505 is illustrated and wherein in FIG. 29 only the airfoil element 509 is illustrated;

FIG. 28 shows a schematic view of an adaptable spoiler according to a further embodiment, illustrating the base element;

FIG. 29 schematically illustrates in a sectional side-view an adaptable spoiler according to an embodiment of the present invention or in perspective views of portions in FIGS. 14 and 15;

FIG. 30 show an attachment portions which may be comprised in the adaptable spoiler according to embodiments of the present invention;

FIG. 31 show an attachment portions which may be comprised in the adaptable spoiler according to embodiments of the present invention; and FIG. 32 schematically illustrates in perspective views attachment portions comprised in an adaptable spoiler according to an embodiment of the present invention.

DETAILED DESCRIPTION

The illustrations in the drawings are schematically. It is noted that in different figures, similar or identical elements are provided with the same reference signs.

Figure 1:
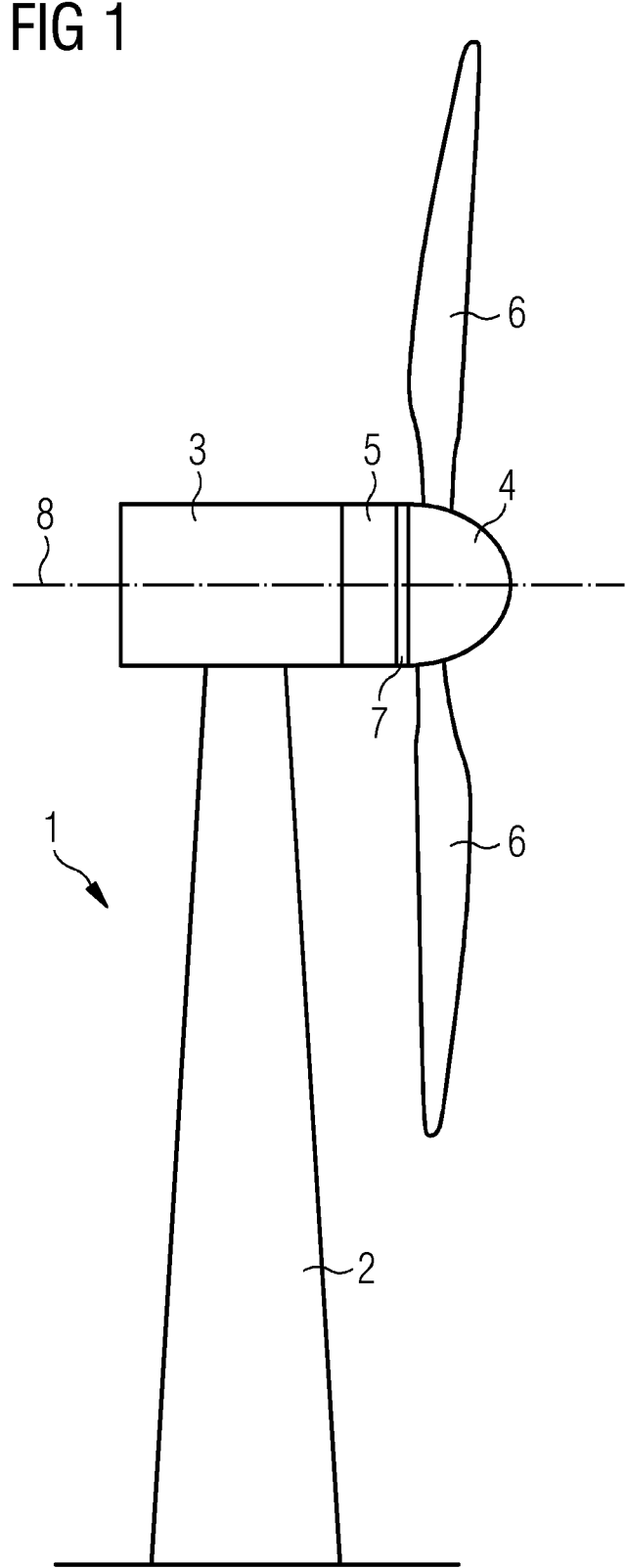
FIG. 1 shows a wind turbine according to an embodiment and different elements thereof.

FIG. 1 shows a wind turbine 1. The wind turbine 1 comprises a nacelle 3 and a tower 2. The nacelle 3 is mounted to the top of the tower 2. The nacelle 3 is mounted rotatable with regard to the tower 2 by means of a yaw bearing. The axis of rotation of the nacelle 3 with regard to the tower 2 is referred to as the yaw axis.

The wind turbine 1 also comprises a hub 4 with three rotor blades 6 (of which two rotor blades 6 are depicted in FIG. 1). The hub 4 is mounted rotatable with regard to the nacelle 3 by means of a main bearing 7. The hub 4 is rotatable about a rotational axis 8.

The wind turbine 1 furthermore comprises a generator 5 which is accommodated within the nacelle 3. The generator 5 is configured to convert rotational energy from the hub 4 into electrical energy. The generator 5 is an electric machine comprising a rotor and a stator, wherein the rotor is connected to the hub 4 and the stator is connected to the nacelle 3. If the hub 4 is directly connected to the rotor, the wind turbine 1 is referred to as a gearless, direct-driven wind turbine. Such a generator 5 is also referred as direct drive generator 5. As an alternative, if the hub 4 is indirectly connected to the rotor via a gear box, this type of wind turbine 1 is referred to as a geared wind turbine. Embodiments of the present invention are suitable for both types of wind turbines 1.

Figure 2:
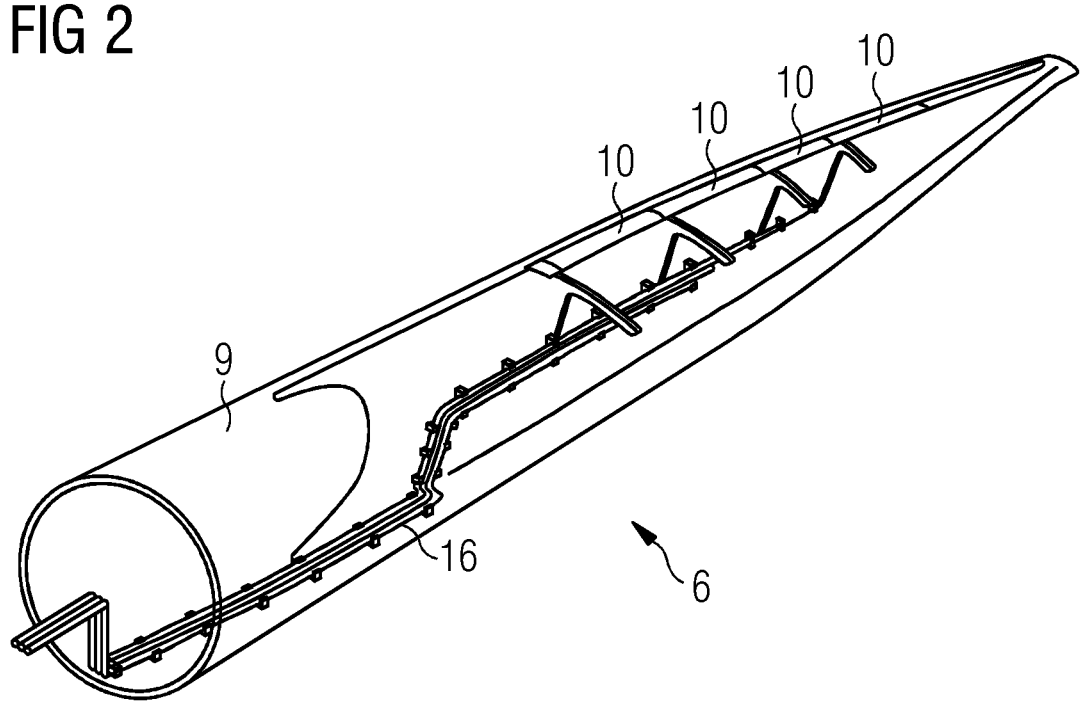
FIG. 2 shows a perspective half-transparent view of a blade according to an embodiment.
Figure 3:
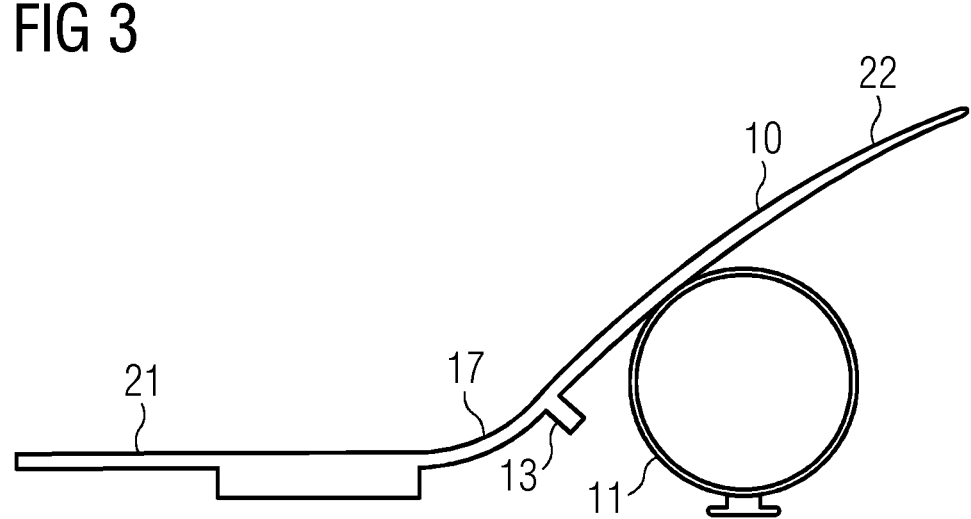
FIG. 3 shows a partial cross-section view of a spoiler according to an embodiment.

FIG. 2 shows a perspective half-transparent view of a blade 6 according to an embodiment, and FIG. 3 shows a partial cross-section view of an active member 10 according to an embodiment. The blade 6 comprises a blade body 9, a plurality of active members 10 which are mounted to the blade body 9 and configured to move between a retracted position and an extended position to change an aerodynamic property of the blade 6. In FIG. 2, the active members 10 are positioned in the retracted position, whereas in FIG. 3, the active member(s) 10 is/are positioned in the extended position.

The blade 6 further comprises a bladder 11 which is configured to be connected to a pneumatic or hydraulic system of the wind turbine 1 to move the active member 10 when the bladder 11 is filled by a fluid supplied by the pneumatic or hydraulic system, or when the fluid is removed from the bladder 11 by the pneumatic or hydraulic system. The fluid is supplied or removed to and from the bladder 11 via hoses 16.

In the embodiment of FIG. 3, each active member 10 comprises an airfoil portion 21 which forms part of an airfoil of the blade 6, and a movable portion 22 which is moved by the bladder 11. The blade 6, in this case each active member 10, further comprises a spring which is configured to retract the active member 10, i.e. in particular the movable portion 22 of the active member 10 into the retracted position. In the embodiment of FIG. 3, the spring is implemented by a flexible portion 17 of each active member 10 which connects the airfoil portion 21 to the movable portion 22.

The wind turbine 1 further comprises a retaining means configured to prevent the active member 10 from moving towards the extended position. In the embodiment of FIG. 3, the retaining means comprises a suction means configured to control a predetermined fluid pressure within the bladder 11 which prevents the bladder 11 from inflating due to pressure which builds up inside the bladder 11 to the centrifugal action on the entrapped air in the hoses 16 and the bladder 11 which is created when the hub 4 rotates. In this case, the bladder 11 is not necessarily to be fixed to the active member 10 because the flexible portion 17 is usually configured to move or maintain the active member 10 to or in the retracted position.

Figure 4:
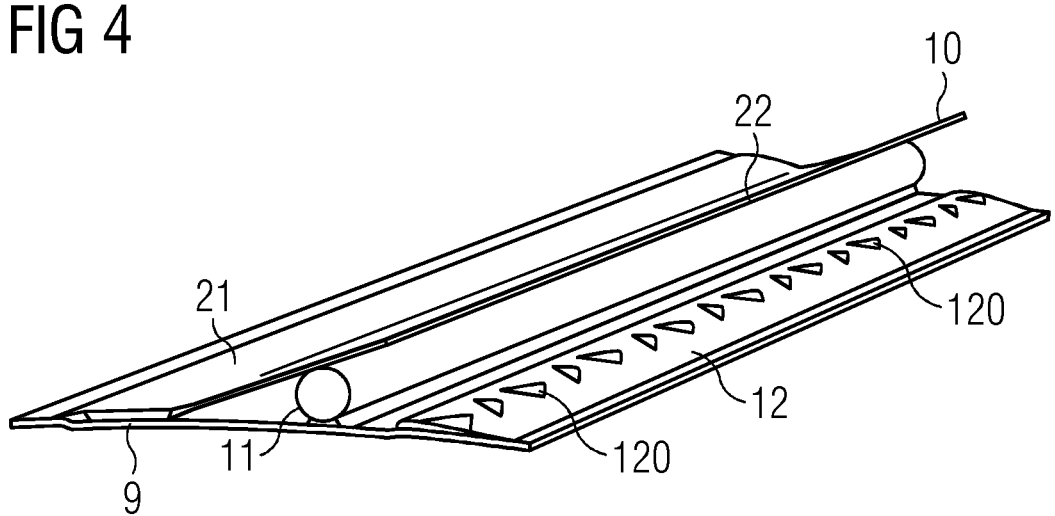
FIG. 4 shows a perspective view of parts of a spoiler mounting plate and vortex generators according to an embodiment.
Figure 5:
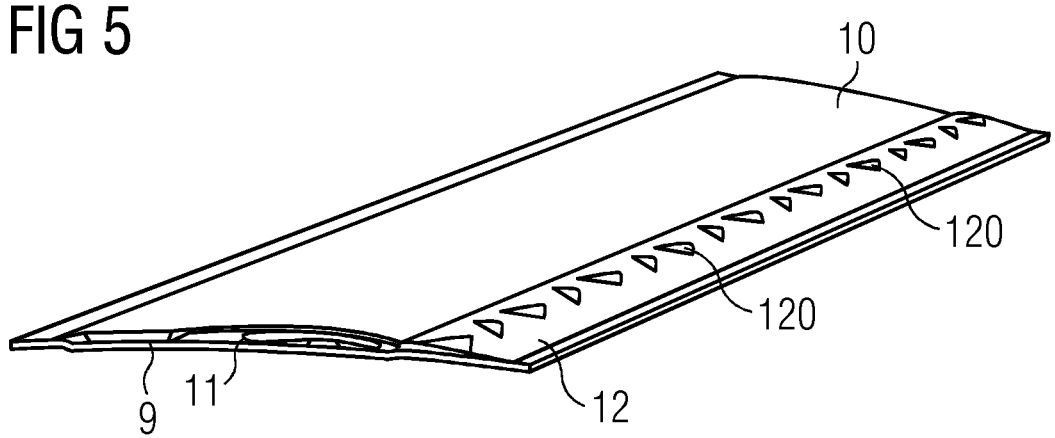
FIG. 5 shows a perspective view of parts of an active member/bladder arrangement according to an embodiment.

FIG. 4 shows a perspective view of an active member 10 and a suction pressure reduction element 12 which is combined with a plurality of vortex generators 120 according to an embodiment, and FIG. 5 shows a perspective view of an active member/bladder arrangement according to the embodiment. In the embodiment of FIGS. 4 and 5, the retaining means is different from that of the previous embodiment. In detail, suction pressure reduction element 12 is provided at the blade body 9 adjacent a trailing edge of the active member 10, wherein the suction pressure reduction element 12 is configured to reduce a suction pressure induced by an air flow on the active member 10 when the active member 10 is in the retracted position. The suction pressure reduction element 12 reduces the suction pressure induced on the active member 10. The local airflow by the trailing edge of the active member 10 is modified, hence reducing the local lift force acting on the active member 10, which is described later in view of FIGS. 6 to 8. The suction pressure reduction element 12 can be shaped as a bulge, a convex bulge.

Figure 6:
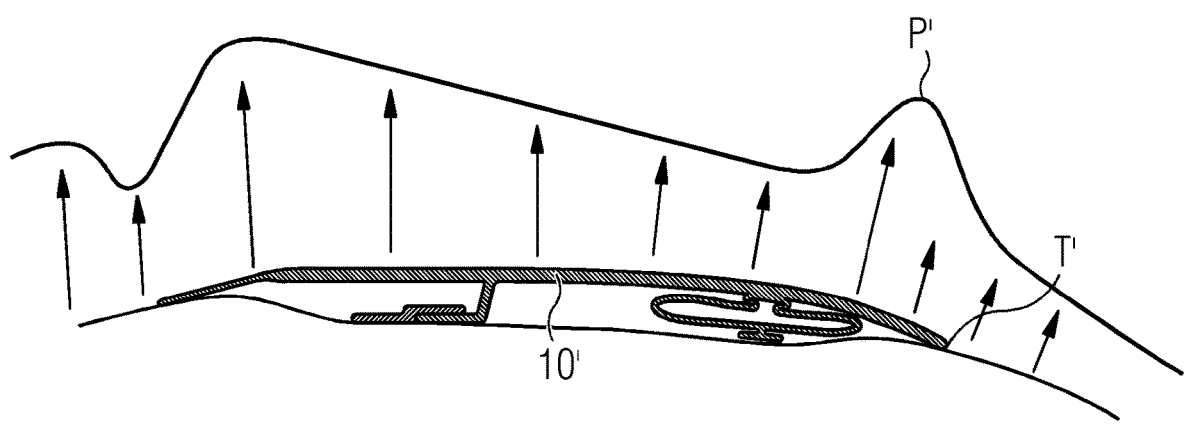
FIG. 6 shows a graph of an aerodynamic suction pressure behavior according to the prior art.

FIG. 6 shows a graph of an aerodynamic suction pressure behavior according to the prior art, where the blade is not provided with any suction pressure reduction element. The suction pressure exhibits a strong peak P' near a trailing edge T' of an active member 10'.

Figure 7:
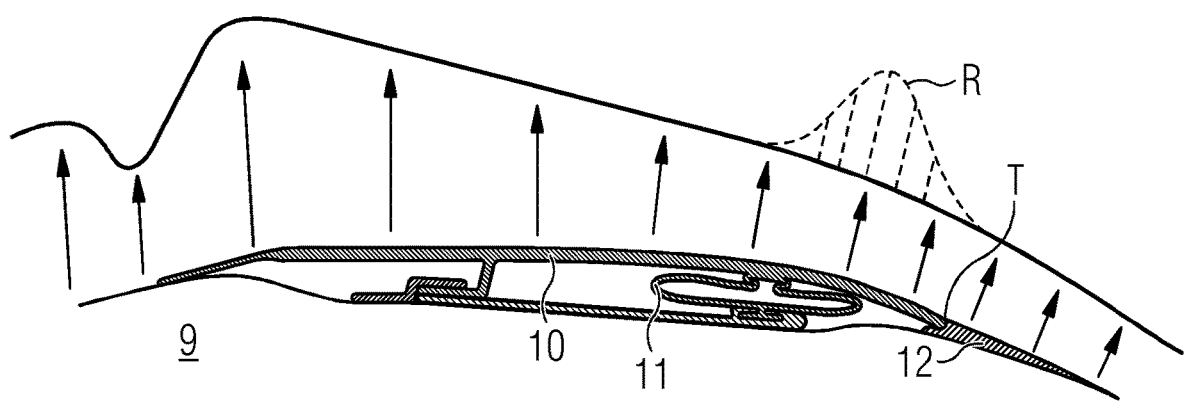
FIG. 7 shows a graph of an aerodynamic suction pressure behavior according to an embodiment of the present invention.

FIG. 7 shows a graph of an aerodynamic suction pressure behavior according to an embodiment of the present invention, where the blade (for example the blade body 9 or also a baseplate) is provided with suction pressure reduction element 12. The suction pressure does substantially not exhibit any peak near a trailing edge T of the active member 10. Reference sign R designates an area of a suction pressure reduction which is achieved by the suction pressure reduction element 12 compared to FIG. 6.

Figure 8:
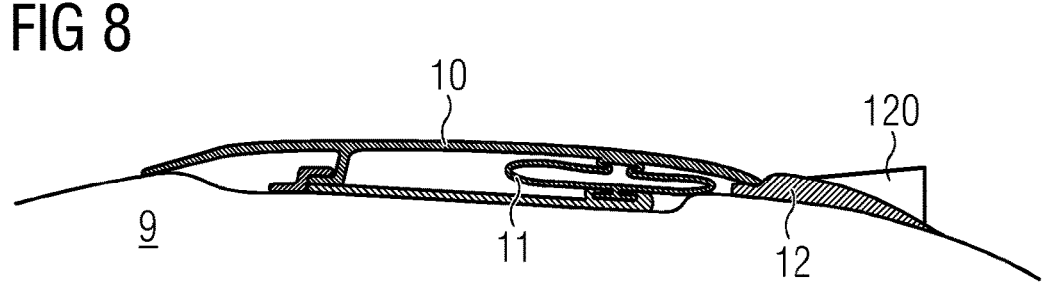
FIG. 8 shows a cross-section of parts of a blade according to an embodiment of the present invention.

FIG. 8 shows a cross-section of parts of a blade according to an embodiment of the present invention, where the blade (for example the blade body 9 or also a baseplate) is provided with a suction pressure reduction element 12 which is combined with at least one vortex generator 120. The vortex generator(s) 120 is/are shaped like fins. The suction pressure behavior is substantially similar like that of FIG. 7, and the vortex generator(s) 120 additionally generate vortices.

The operating principle of the suction pressure reduction element 12 is to reduce local aerodynamic suction on the spoiler due to its own outer contour, in particular towards the trailing edge T of the active member 10, which is embodied as a spoiler here. The effect of this is that the total suction on the active member 10, i.e. the aerodynamic force trying to lift it from the surface, is reduced. By using such a suction reduction element 12, part of the suction pressure distribution is transferred from the active member 10 onto the suction reduction element 12. This is done by an appropriate adjustment of the outer contour of the active member 10 and of the suction reduction element 12. The suction reduction element 12 can either be configured such that the active members' trailing edge T rests on it, as shown in FIGS. 7 and 8, or be configured to butt-joint with a thicker spoiler trailing edge. Additionally, the suction reduction element 12 can be combined with the vortex generator(s) 120 or any other type of flow regulating devices.

Figure 9:
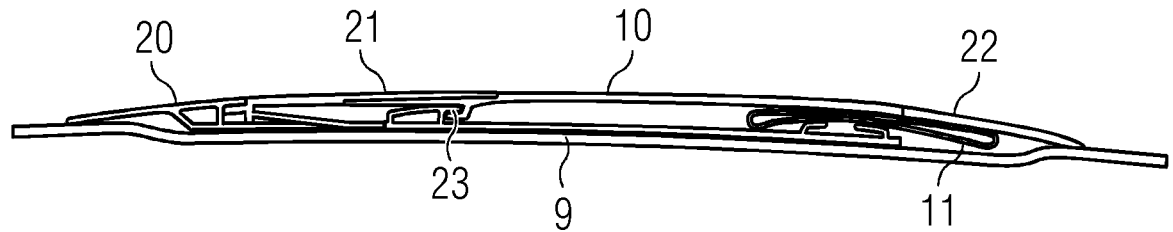
FIG. 9 shows a cross-section view of parts of a blade according to an embodiment.

FIG. 9 shows a cross-section view of parts of a blade 6 according to an embodiment. In this embodiment, the active member 10 further comprises a baseplate 20. The airfoil portion 21 is connected by a clip-connection 23 (see also FIGS. 10 to 12) or any other force-fit or form-fit connection to the baseplate 20, wherein the clip-connection 23 can act as a fulcrum. The bladder 11 is arranged and/or fixed between the baseplate 20 and the movable portion 22 of the active member 10. The baseplate 20 in turn is fixed to the blade body 9, for example by gluing. In this embodiment, the active member 10 and the bladder 11 are implemented in a single module which can readily be mounted to the blade body 9, for example by gluing.

Figure 10:
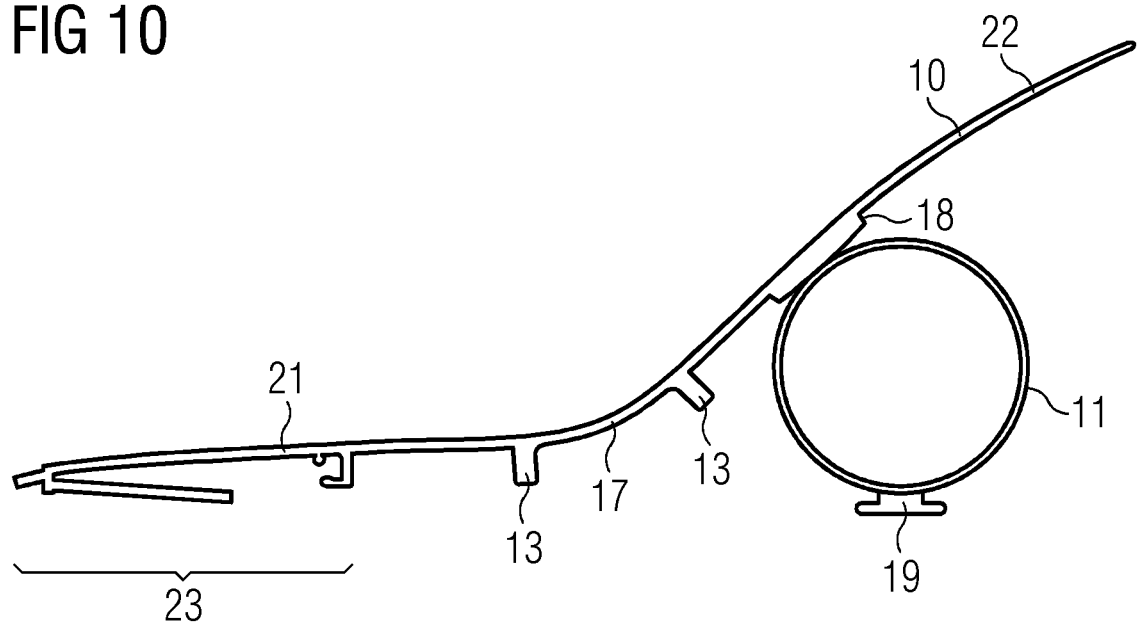
FIG. 10 shows a partial cross-section view of a spoiler according to an embodiment.
Figure 11:
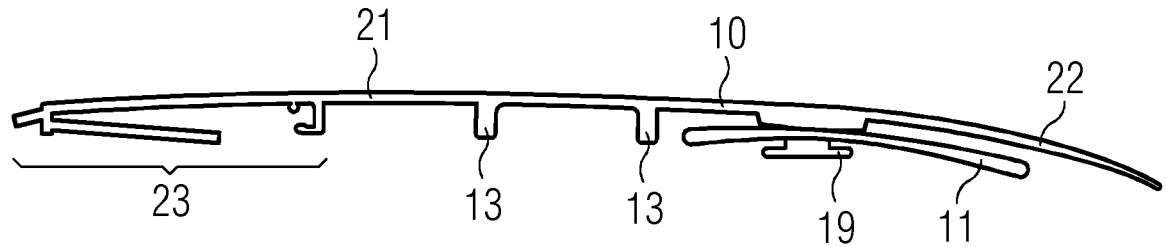
FIG. 11 shows a partial cross-section view of a spoiler according to an embodiment.

FIG. 10 shows a cross-section view of an active member 10 according to an embodiment, where the bladder 11 is inflated, and FIG. 11 shows a cross-section view of the active member 10, where the bladder 11 is deflated. The blade 6 comprises a plurality of abutment members 13 which are arranged at the active member 10, strictly speaking at the airfoil portion 21 and at the movable portion 22, i.e. at portions in front and behind of the flexible portion 17. The abutment members 13 define the retracted position of the active member 10 when the abutment members 13 abut on or are pressed to the blade body 9. The abutment members 13 can directly abut on the blade body 9, or they can be pressed towards the blade body 9, for example when a baseplate 20 or another intermediate element is arranged between the abutment members 13 and the blade body 9.

The abutment members 13 can fulfill several functions. First, the abutment members 13 define the final shape of the active member 10 when the abutment members 13 abut on the blade body 9 or are pressed towards the blade body 9. Second, the abutment members 13 can form a fulcrum so that, given a certain suction level in the bladder 11, the contact force between the active member's trailing edge and the blade 6 is increased, and the required pressing force of the bladder 11 for down-pressing the active member 10 can be reduced. Each abutment members 13 can be shaped as a leg or a rib.

Figure 13:
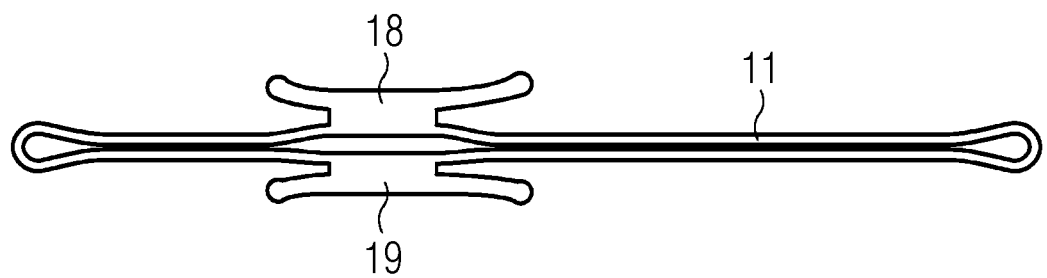
FIG. 13 shows a cross-section view of a bladder according to an embodiment.

The embodiment of FIGS. 10 and 11 can be used together with the suction means which configured to control a predetermined fluid pressure within the bladder 11 which prevents the bladder 11 from inflating due to a centrifugal force which is created when the hub 4 rotates. In this case, the bladder 11 is not necessarily to be fixed to the active member 10. In a modification, the embodiment of FIGS. 10 and 11 can use the bladder 11 as shown in FIG. 13 (described later) together with the suction means which is configured to apply a negative pressure in the bladder 11 in order to actively press or retain the active member 10 to/in the retracted position. In this case, the bladder 11 is mechanically fixed to the active member 10 and (directly or indirectly) to the blade body 9.

Figure 12:
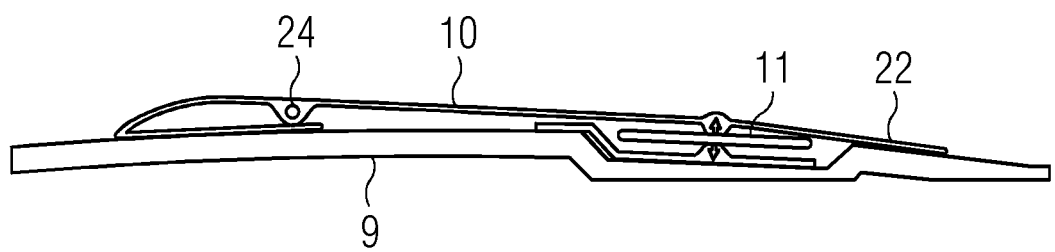
FIG. 12 shows a partial cross-section view of a spoiler according to an embodiment.

FIG. 12 shows a partial cross-section view of an active member 10 according to an embodiment, and FIG. 13 shows a cross-section view of a bladder 11 according to an embodiment. In the embodiment of FIGS. 12 and 13, the retaining means is different from that of FIG. 3. In the embodiment of FIGS. 12 and 13, the retaining means is implemented in that the bladder 11 is fixed to the blade body 9 and the active member 10, in particular to the movable portion 22 of the active member 10, wherein the active member 10 is pressed and/or retained in the retracted position by a suction means configured to apply a negative pressure in the bladder 11. In the embodiments, a control means (not shown) can be provided which is configured to control a fluid pressure within the bladder 11.

In FIG. 12, the bladder 11 is drawn inside a recess of the blade body 9 or a support element/baseplate 20 of the active member 10; however, this recess is not essential, and the bladder 11 could also be installed on a nominal (smooth, no recessed) surface of the blade body 9 or the support element/baseplate 20 of the active member 10.

FIG. 14 shows a cross-section view of a bladder 11 according to an embodiment. Limiting members 14 are arranged within the bladder 11, wherein the limiting members 14 define a minimum deflated state of the bladder 11. The limiting members 14 are particularly advantageous in the retaining means of option a) which uses partial suction pressure, because the limiting members 14 prevent the bladder 11 from closing airtightly under vacuum and potentially prevents a portion of the bladder 11 to deflate completely. The limiting members 14 can be an extruded rib inside the bladder 11 or an additional member placed inside the bladder 11, for example a mesh or a foam.

Several modifications and combinations are conceivable. For example the embodiment of FIG. 12 can be modified by the features of the embodiment of FIG. 9.

Attachment portions 18, 19 of the bladder 11 (see FIGS. 11 to 14) provide for a form-fit or force-fit connection between bladder 11 and baseplate 20 on the one hand, and between the bladder 11 and the active member 10 (movable portion 22) on the other hand. For example, the bladder 11 can be slid in a longitudinal direction of the blade into corresponding receiving portions of the baseplate 20 and the active member 10 (movable portion 22).

The embodiments can be modified in that the active member 10 is hinged to the blade body 9 by a hinge such as a hinge 24 in FIG. 12, wherein a separate spring presses the active member 10 into the retracted position.

The embodiments can structurally be modified by features from the embodiments of FIGS. 15 to 32:

The adaptable spoiler 100 as schematically illustrated in FIG. 15 along a longitudinal axis 101 of a rotor blade 103 in a sectional side-view comprises a base element 105 which is adapted to be connected at or integrated with a rotor blade surface 107 of the rotor blade 103 which is partly illustrated in FIG. 15. The adaptable spoiler 100 further comprises an airfoil element 109 which is (e.g. reversibly or permanently) attachable to the base structure 105 (for example illustrated in FIG. 17) and having an airfoil shaped surface 111 to be exposed to an air flow 113 during operation of a wind turbine. The airfoil element 109 comprises an encapsulated core 110 providing enforcement.

The rotor blade 103 has a longitudinal axis 101 which is substantially perpendicular to the flow direction 113 of the air during operation of the wind turbine. The base element 105 comprises at least one attachment portion 115 and also the airfoil element 109 comprises at least one attachment portion 117. Thereby, the attachment portions 115 and 117 of the base element 105 and the airfoil element 109 are engageable with each other, as is for example illustrated in FIG. 17.

As can be taken from FIG. 15, the attachment portion 115 of the base element 105 is arranged in an upstream region 119 of the base element 105, in particular in a region between 5% and 50% of the entire extent lbe of the base element along the flow direction 113. Furthermore, the attachment region 117 of the airfoil element 109 is also arranged within an upstream region 121 of the airfoil element 109, in particular in a region between 0% and 50% of an entire extend lae of the airfoil element.

FIG. 15 illustrates a disassembled state, in which the airfoil element 109 is not attached to the base element 105. As can be appreciated from FIG. 15, the airfoil element 109 is pre-bent such that upon attaching the airfoil element 109 at the base element 105 (as illustrated in FIG. 17) the rear edge 123 of the airfoil element 109 presses upon the surface 107 of the rotor blade 103. Thus, the airfoil element 109 presses in a downstream region 125 towards the rotor blade surface 107 or in other embodiments towards the base element 105.

Below it is referred to a chordwise direction 113 that is a direction that points from the leading edge towards the trailing edge of the rotor blade. During normal operation the chordwise direction 113 is along an airflow direction. In the following the airflow direction is meant to be equal to the chordwise direction.

The attachment portion 115 of the base element 105 comprises in the illustrated embodiment two noses 127, 129 being spaced apart in the chordwise direction or airflow direction 113 and pointing according to the flow direction 113 downstream. Also the attachment portion 117 of the airfoil element 109 comprises two noses 131, 133 also being spaced apart in the flow direction 113 but pointing towards upstream. When the airfoil element 109 is attached to the base element 105 (see FIG. 171), the noses 131, 133 of the attachment region 117 of the airfoil element 109 engage below the noses 127, 129 of the base element 105. Furthermore, an elastic tongue 137 of the attachment region 117 of the airfoil element 109 is bent in the assembled state and contacts a protrusion 139 comprised in the attachment portion 115 of the base element.

Figure 16:
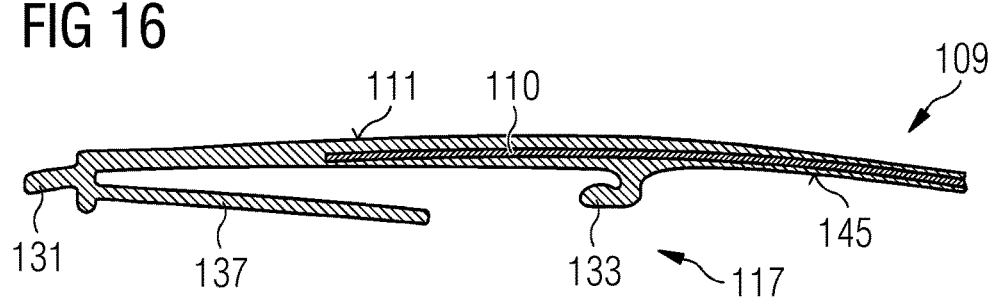
FIG. 16 shows a detailed view of a portion of the airfoil element showing an attachment region, according to an embodiment.

The adaptable spoiler 100 illustrated in FIGS. 15 to 17 further comprises an inflatable, expandable container 141, for example configured as a bag or a hose and made from elastic deformable material. The container is illustrated in FIG. 15 in a disassembled and deflated state and in FIG. 17 in an assembled state. The expandable container 141 comprises a lumen 143 which is fillable with a fluid, such as air. Filling the lumen 143 of the container 141 to a different agree will expand the container 141 to a different degree thereby touching and pushing a back-surface 145 of the airfoil element 109 for flexing upwards the airfoil shaped surface 111 of the airfoil element, thereby achieving different states of the adaptable spoiler 100.

The container 141 is fixable at or to the base element 105. Therefore, the container 141 comprises an engagement portion 147 and the base element comprises a respective engagement portion 149 in particular in a downstream region 151 of the base element 105. The engagement portions 147 and 149 of the container 141 and the base element 105, respectively, are engageable with each other. In particular, also the engagement portion 147 of the container comprises noses which latch or catch below noses of the engagement portion 149 of the base element.

FIG. 16 schematically illustrates in more detail a portion of the airfoil element 109 showing the attachment region 117.

When the inflatable container 141 is inflated to a different degree, a state sketched in dashed lines in FIG. 17 is achieved. In particular, the container is now labelled with reference sign 141' and the airfoil shaped surface of the airfoil element 109 is labelled with reference sign 111'. It can be seen from FIG. 17 that the position and/or orientation and/or shape of the downstream portion 125 of the airfoil element 109 is changed, while the position and/or orientation and/or shape of the airfoil element 109 is substantially unchanged in the upstream region 121.

As can be seen in FIG. 15, the rotor blade surface has in the region of the attached base element 105 a slight depression as indicated with Δ. Thus, the base element 105 is slightly submerged into the rotor blade 103.

FIGS. 18 to 20 illustrate in a sectional side-view an adaptable spoiler 200 according to another embodiment of the present invention, wherein FIGS. 19 and 20 illustrate partial views. Similar to the embodiment of the adaptable spoiler 100 illustrated in FIGS. 15 to 17, also the base element 215 of the spoiler 200 comprises an attachment portion 215 in an upstream region 219. Thereby, the attachment portion 215 comprises hook-like protrusions 227, 229 which engage with an attachment portion 217 of the airfoil element 209 having the airfoil shaped surface 211. Thereby, the attachment portion 217 comprises a front nose 231 pointing downstream and a further nose 235 (or hook) pointing upstream. In contrast, the nose 227 of the base element 205 points upstream engaging with the downstream directed nose 231 of the airfoil element 209. The downstream directed nose or hook 229 of the base element 205 engages with the upstream pointing nose 235 of the airfoil element 299.

Also the adaptable spoiler 200 comprises an inflatable, expandable container 241 between a downstream portion 225 of the base element 205 and the airfoil element 209 (see FIG. 20). Also, the container 241 is attached via an engagement portion 247 via an engagement portion 249 to the base element 205 in the downstream region 225. Additionally however to the embodiment of the spoiler 100 illustrated in FIGS. 15 to 17, the airfoil element 209 comprises also an engagement portion 253 which is engaged with a further engagement portion 255 of the container 241. In particular, the engagement portions 247, 255 of the base element 205 and the airfoil element 209, respectively, are configured as recesses into which protrusions of respective engagement portions of the container 241 are inserted thereby being hold by a latching or interlocking mechanism. For inserting the protrusions 255, 247 of the container 241 into the recesses 249, 253 the protrusions 255, 247 having an extended head portion may slightly be formed.

The base element 205 illustrated in FIGS. 18 and 19 is slightly submerged by an amount Δ into the rotor blade 203.

FIGS. 21 to 23 illustrate another adaptable spoiler 300 according to an embodiment of the present invention, wherein FIGS. 22 and 23 illustrate partial views. While the base elements 105, 205 illustrated in FIGS. 15, 18 and 19 are submerged over their entire length, most of the base element 305 of the adaptable spoiler 300 illustrated in FIGS. 21 to 20 is arranged at the unchanged rotor blade surface having no depression in the entire extent of the base element 305. However, a depression of the rotor blade surface is present in a downstream region 357 in which the depression amounts to a value Δ. Outside the downstream region 357 there is no depression of the rotor blade surface 307. The depression Δ allows for accompanying the expandable inflatable container 341 which may be configured similarly to the container 241 of the adaptable spoiler 200 illustrated in FIGS. 18 to 20. Furthermore, the attachment portion 315 of the base element 305 comprises an upstream pointing nose 327 being engaged with a downstream pointing nose 331 of the airfoil element 309. Furthermore, the base element 305 comprises a downstream directed nose 329 being engaged with an upstream directed nose 335 of the airfoil element 305. In the region 357 of the depression of the rotor blade, the base element 305 is submerged into the rotor blade.

FIGS. 24 to 26 illustrate an adaptable spoiler 400 according to an embodiment of the present invention. An airfoil element 409 is attachable to a base element 405 by a hinge mechanism 465 which forms the respective attachment portion. The base element as well as the airfoil element 405, 409 both comprise a through-hole 459, 461 through which a pin 463 is insertable to establish the hinge 465 (see FIGS. 25 and 26). The pin 463 and the through-holes 459, 461 substantially are oriented along the longitudinal axis 401 of a rotor blade at which the adaptable spoiler 400 is mounted. Thus, in the adaptable spoiler 400 illustrated in FIGS. 24 to 26 the attachment portions 417 and 415 of the airfoil element 409 and the base element 405, respectively, are formed by the portions having the through-holes 459, 461, respectively.

The downstream region of the base element 405 as well as the airfoil element 409 have similarities to those of the adaptable spoiler 300 illustrated for example in detail in FIG. 23. While FIG. 25 illustrates the spoiler while the container 441 is deflated, FIG. 26 illustrates the situation, where the container 441 is inflated such that the airfoil shaped surface 411 of the airfoil element 409 is tilted upwards away from the rotor blade surface 407, thereby setting the adaptable spoiler 400 in a particular activation state.

FIGS. 27 to 29 illustrate schematically an adaptable spoiler 500 according to still a further embodiment, while in FIG. 28 the base element 505 is illustrated and wherein in FIG. 29 only the airfoil element 509 is illustrated. The attachment portion 515 of the base element 505 comprises holes 567 and not in detail illustrated guide edges. Elastic support protrusions or latching noses 569 comprised in the airfoil element 509 represent the respective attachment portion 517 of the airfoil element 509. These elastically held noses 569 will slip into the openings 567 for (reversibly or permanently) attaching the airfoil element 509 with the base element 505.

FIGS. 30 to 32 illustrate further variants or embodiments of attachment portions of on one hand the base element 605 and on the other hand the airfoil element 609 which may be comprised in the adaptable spoiler according to embodiments of the present invention. In the illustrated embodiments, the base element 605 has as attachment portion 615 downstream directed noses which engage with upstream directed noses 631, 635 of the airfoil element 609. While the FIGS. 30 and 31 illustrate an elastic tongue 637, which end is interlocked with a protrusion 639 at the or of the base element 605, in FIG. 32 a front portion 671 of the airfoil element 609 interlocks with a front portion 673 of the base element for avoiding releasing the airfoil element unintentionally by sliding it in a downstream direction.

Embodiments of the present invention may provide several benefits:
Simple and fast installation
Simple and fast repair/exchange/service of elements
Simple manufacturing
increase of drag level when desired,
fast power control,
additional degree of freedom for control of aerodynamic forces on blades.

Embodiments may be applied to at least one of the following:
Selective reduction of loading at different positions along the spanwise direction at different wind speeds,
increase of aerodynamic damping at high wind speeds, or when else required
reduction of aerodynamic loading during over-speed situations,
reduction of aerodynamic loading during idling,
reduction of aerodynamic loading during manual, emergency, or normal shutdown events,
reducing pitch activity by combination of pitching and activation of the flow-regulating device,
activation of spoiler in combination with individual pitch control.

There are a number of possible activations:
Activation depending on the rotor speed of the turbine
Slow activation (for example depending only on wind speed),
Fast activation (for example 1P or 3P for a combination with IPC)
on/off activation (for example for over-speed, shutdown events, events with extreme high turbulence),
persistent activation (for example for idling),
independent activation of different spoiler sections on the blade
Independent activation of different spoiler sections on the blade to maintain the rotor speed at the nominal level Possible pressure supply system characteristics include the following:
activation by means of a pressurized fluid, in particular pressurized air, pressurized dry air, or any other gas such as inert gases (e.g. nitrogen or helium)
low required volume of air (achieved for example by controlling a change of shape in the pressurized chamber, rather than an expansion of the chamber),
pressurized reservoirs close to the points of activation (for rapid response and reduction of power requirements for the supply system). This can be done for example by placement of tubes of larger diameter internally in the blade close to the pressure supply points,
simultaneous connection to pressure and vacuum chambers to increase response speed,
constant flow through a purge valve to avoid accumulation of humidity/dirt/compression oil, etc.
use of pre-heated air in case icing could be an issue,
independent activation of different radial segments,
use of control valves at particular stations to avoid/permit flow of pressurized air from one radial position to a further radial position,
use of pneumatically activated pneumatic valves (to avoid electrical signals),
use of stagnation pressure at some radial station as input to pneumatic control valves,
use pitch position as input to pneumatic control valves (for example high pitch position file open valves and thus activate the spoiler),
Use the rotor speed as input to pneumatic control valves (for example high rotor speed may lead to opening of valves and thus activation of the spoiler),
Use of turbulence level as input to pneumatic control valves.

In the flow spoiler there may be no need for an electrical or mechanical component.

According to embodiments of the present inventions the following features are provided that may be applied to all embodiments described above, alone or in combination:
The container's shape may be optimized to reduce friction distance with the airfoil element. The container may therefore typically be non-symmetric;
the container's foot may also be non-symmetric in order to forbid mounting in the wrong direction;
low friction strips can be added on the airfoil element and/or the container at specific locations to reduce the wear
the base element may be produced as one element to ensure a consistent relative positioning between the airfoil element and the container, or, inversely, as two elements to enable different relative positioning and hence different lifting heights for the same container and/or airfoil element;
the container may integrate an elastic element, for example fiber reinforced, to assist in deflating.

For example, the active member 10 can be embodied like the adaptable spoilers 100, 200, 300, 400, 500, 600. The bladder 11 can be embodied like the expandable containers 141, 241, 341, 441. The attachment portions 18, 19 can be embodied like the engagement portions 147, 247, 347 and the further engagement portions 255, 355, respectively. The baseplate 20 can be embodied like the base elements 105, 205, 305, 405, 505. The clip connection 23 can be embodied as shown in FIGS. 15 to 19, 21, 22, 30 to 32.

The suction pressure reduction element 12 can be embodied like the above-mentioned flow regulating device or vortex generator 120.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine including a tower, a nacelle mounted to a top of the tower, a hub being rotatably mounted to the nacelle, and at least one blade mounted to the hub, the at least one blade comprising:
   a blade body;
   an active member mounted to the blade body and configured to move between a retracted position and an extended position to change an aerodynamic property of the at least one blade;
   a bladder which is configured to be connected to a pneumatic or hydraulic system of the wind turbine to move the active member when the bladder is filled by a fluid supplied by the pneumatic or hydraulic system, or when the fluid is removed from the bladder by the pneumatic or hydraulic system; and
   a retaining means configured to prevent the active member from moving towards the extended position, wherein the retaining means comprises:
   a) a suction means configured to control a predetermined fluid pressure within the bladder which prevents the bladder from inflating due to a pressure build up due to centrifugal forces on the fluid inside the bladder, which is created when the hub rotates, wherein:
      a flexible portion is provided which is configured to move or maintain the active member to or in the retracted position, wherein the active member comprises a movable portion and an airfoil portion with the flexible portion therebetween, and the airfoil portion is positioned a distance away from the bladder;
   b) the bladder is fixed to a baseplate at a first discrete location of the baseplate, and the active member is fixed to the baseplate at a second discrete location of the baseplate, the first discrete location and the second discrete location being spaced apart from each other along the baseplate, the baseplate being fixed to the blade body wherein the active member is pressed and/or retained in the retracted position by the suction means configured to apply a negative pressure in the bladder; or
   c) a suction pressure reduction element contacting the active member and the blade body downstream of a trailing edge of the active member or at the trailing edge of the active member, the suction pressure reduction element being configured to reduce a suction pressure induced by an air flow on the active member when the active member is in the retracted position.

2. The wind turbine according to claim 1, further comprising:
   a spring or a pretensioned member configured to retract and keep retracted the active member into the retracted position.

3. The wind turbine according to claim 1, further comprising:
   an abutment member arranged at one of the active member, and/or the baseplate and/or the blade body, wherein the abutment member defines the retracted position of the active member when the abutment member abuts on or presses to the other one of the active member and the baseplate and/or the blade body.

4. The wind turbine according to claim 3, wherein the abutment member is shaped as a leg or a rib.

5. The wind turbine according to claim 1, further comprising:
   a limiting member arranged within the bladder, wherein the limiting member defines a minimum deflated state of the bladder, and the limiting member is an extruded rib or a mesh placed inside the bladder.

6. The wind turbine according to claim 1, wherein the suction pressure reduction element is shaped as a bulge.

7. The wind turbine according to claim 1, wherein: the suction pressure reduction element is combined with at least one vortex generator.

8. The wind turbine according to claim 1, wherein the trailing edge of the active member rests on the suction pressure reduction element.

9. The wind turbine according to claim 1, wherein the trailing edge of the active member forms a butt-joint with the suction pressure reduction element.

10. The wind turbine according to claim 1, wherein the bladder is fixed to the baseplate at the first discrete location via an attachment portion that physically connects the bladder to the baseplate, and the active member is fixed to the baseplate at the second discrete location via a clip connection physically connecting the active member to the baseplate.

11. A method of controlling a wind turbine, the wind turbine comprising a tower, a nacelle mounted to a top of the tower, a hub being rotatably mounted to the nacelle, and at least one blade mounted to the hub, the blade comprising a blade body, an active member mounted to the blade body and configured to move between a retracted position and an extended position to change an aerodynamic property of the blade, a bladder which is configured to be connected to a pneumatic or hydraulic system of the wind turbine to move the active member when the bladder is filled by a fluid supplied by the pneumatic or hydraulic system, or when the fluid is removed from the bladder by the pneumatic or hydraulic system, the method comprising:
   a retaining step to prevent the active member from moving towards the extended position, wherein the retaining step comprises:
   a) a suction step to control a predetermined fluid pressure within the bladder which prevents the bladder from inflating due to a pressure build up due to centrifugal forces on the fluid inside the bladder, which is created when the hub rotates, wherein a flexible portion is provided which is configured to move or maintain the active member to or in the retracted position, wherein the active member comprises a movable portion and an airfoil portion with the flexible portion therebetween, and the airfoil portion is positioned a distance away from the bladder; or b) the bladder is fixed to a baseplate at a first discrete location of the baseplate, and the active member is fixed to the baseplate at a second discrete location of the baseplate, the first discrete location and the second discrete location being spaced apart from each other along the baseplate, the baseplate being fixed to the blade body, wherein the active member is pressed and/or retained in the retracted position by the suction means configured to apply a negative pressure in the bladder.

12. A blade for a wind turbine, comprising:

a blade body;

an active member mounted to the blade body and configured to move between a retracted position and an extended position to change an aerodynamic property of the blade;

a bladder which is configured to be connected to a pneumatic or hydraulic system of the wind turbine to move the active member when the bladder is filled by a fluid supplied by the pneumatic or hydraulic system, or when the fluid is removed from the bladder by the pneumatic or hydraulic system; and a suction pressure reduction element contacting the active member and the blade body downstream of a trailing edge of the active member or at the trailing edge itself, the suction pressure reduction element being configured to reduce a suction pressure induced by an airflow on the active member when the active member is in the retracted position, so that the active member is prevented from moving towards the extended position.

13. The blade according to claim 12, wherein the suction pressure reduction element is shaped as a bulge.

14. The blade according to claim 12, wherein:

the suction pressure reduction element is combined with at least one vortex generator.

15. The blade according to claim 11, further comprising:

a spring or a pretensioned member configured to retract the active member into the retracted position.

16. The blade according to claim 12, further comprising:

an abutment member arranged at one of the active member and/or at a baseplate and/or at the blade body, wherein the abutment member defines the retracted position of the active member when the abutment member abuts on or presses to the other one of the active member and the blade body.

* * * * *